United States Patent
Jenkins et al.

(10) Patent No.: US 8,666,093 B2
(45) Date of Patent: *Mar. 4, 2014

(54) PROCESSING AN AUDIO INPUT SIGNAL TO PRODUCE A PROCESSED AUDIO OUTPUT SIGNAL

(75) Inventors: Christopher Sefton Jenkins, Woodstock (GB); Mark Nicholas Stow, Kidlington (GB)

(73) Assignee: Red Lion 49 Limited, Begbroke, Oxford (GB)

( * ) Notice: Subject to any disclaimer, the term of this patent is extended or adjusted under 35 U.S.C. 154(b) by 300 days.

This patent is subject to a terminal disclaimer.

(21) Appl. No.: 13/313,989

(22) Filed: Dec. 7, 2011

(65) Prior Publication Data

US 2012/0081605 A1    Apr. 5, 2012

Related U.S. Application Data

(62) Division of application No. 11/610,035, filed on Dec. 13, 2006, now Pat. No. 8,094,837.

(30) Foreign Application Priority Data

Dec. 22, 2005  (GB) .................................. 0526143.3

(51) Int. Cl.
H03G 9/00 (2006.01)
H04R 29/00 (2006.01)
H03G 3/00 (2006.01)
H03G 5/00 (2006.01)

(52) U.S. Cl.
USPC ................. 381/102; 381/56; 381/61; 381/98; 381/101; 381/104

(58) Field of Classification Search
USPC ............ 381/102, 98, 61, 97, 99, 101, 104, 56
See application file for complete search history.

(56) References Cited

U.S. PATENT DOCUMENTS

| 4,467,287 A | 8/1984 | Aylward |
| 5,067,157 A | 11/1991 | Ishida et al. |
| 5,388,159 A | 2/1995 | Sakata |
| 5,877,447 A | 3/1999 | Vice |
| 5,926,334 A | 7/1999 | Suzuki |

FOREIGN PATENT DOCUMENTS

| GB | 2057228 A | 3/1981 |
| GB | 2126851 A | 3/1984 |
| GB | 2277239 A | 10/1994 |
| GB | 2294854 A | 5/1996 |

*Primary Examiner* — Xu Mei
*Assistant Examiner* — Douglas Suthers
(74) *Attorney, Agent, or Firm* — Richard M. Goldberg

(57) ABSTRACT

An audio input signal is processed to produce a processed audio output signal. An audio input signal is received as an original signal. The audio input signal is dynamically filtered to produce a first stage signal consisting of a selected frequency band of the input signal. Gain applied to the first stage signal is dynamically controlled in response to a control signal to produce a second stage signal. The control signal is derived from the first stage signal. Processing the original signal in combination with the second stage signal to produce a processed audio output signal. Processing the original signal in combination with the second stage signal and the first stage signal to produce a processed audio output signal.

15 Claims, 9 Drawing Sheets

PROCESSING AN AUDIO INPUT SIGNAL TO PRODUCE A PROCESSED AUDIO OUTPUT SIGNAL

CROSS REFERENCE TO RELATED APPLICATIONS

This application claims priority to United Kingdom Patent Application No. 05 26 143.3 filed 22 Dec. 2005, the entire disclosure of which is incorporated herein by reference in its entirety as if fully set forth herein.

FIELD

The present invention relates to a method of processing an audio input signal to produce a processed audio output signal and to an audio signal processing apparatus for processing an audio input signal to produce a processed output signal. The invention also relates to a computer readable medium having computer readable instruction executable by computer such that, when executing these instructions a computer will process an audio input signal to produce a processed audio output signal.

BACKGROUND

Audio signals may be derived from a variety of sources, and may be supplied to an audio processing environment for processing. An audio processing environment may include a mixing desk having processing functionality and parameters that are controllable by an operator.

SUMMARY

According to an aspect of the present invention, there is provided a method of processing an audio input signal to produce a processed audio output signal, comprising the steps of: receiving an audio input signal as an original signal, dynamically filtering said audio input signal to produce a first stage signal consisting of a selected frequency band of said audio input signal; dynamically controlling gain applied to said first stage signal in response to a control signal to produce a second stage signal; deriving said control signal from said first stage signal, and processing said original signal in combination with said second stage signal to produce said processed audio output signal.

According to a further aspect of the present invention, said original signal is processed in combination with said second stage signal and said first stage signal to produce said processed output signal.

WRITTEN DESCRIPTION OF THE BEST MODE FOR CARRYING OUT THE INVENTION

Figure 1:
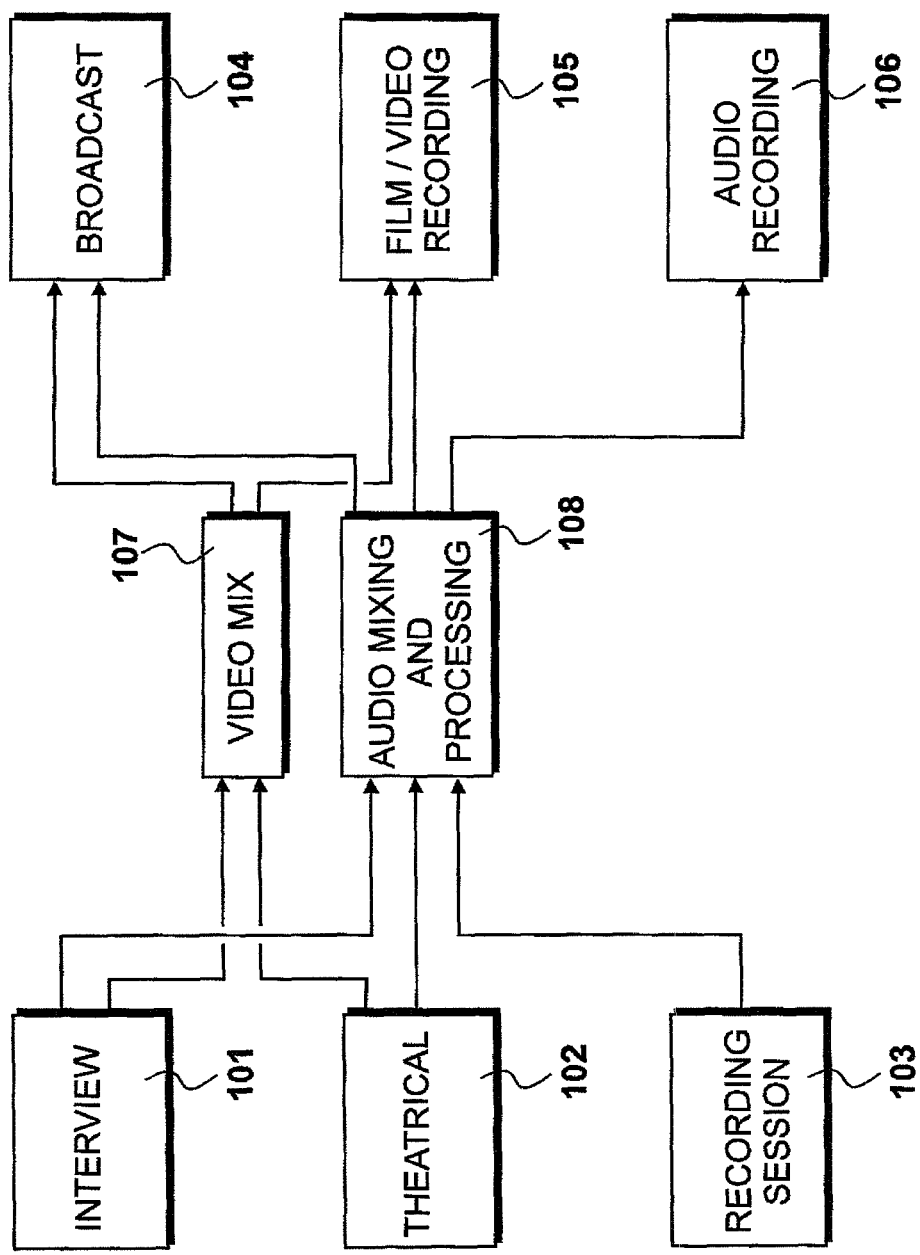
FIG. 1 shows an environment in which audio signals are processed.

An environment in which audio signals are processed is illustrated in FIG. 1. Audio signals may be derived from many sources and three such sources are identified in FIG. 1, by way of example only. The first audio source may be generated by an interview 101, possibly to be recorded or, alternatively, to be broadcast immediately.

The second audio source is identified as theatrical 102, this being in the form of a television programme being recorded or a cinematographic film being produced. Thirdly, recording section 103 is identified as a third source of audio material which, on this occasion, will result in the release of audio material but may require substantial amounts of processing and mixing before the final results are produced.

In addition, in FIG. 1, typical output recipients are identified. At 104 a broadcasting environment is shown, that may take the form of an audio broadcast, a television broadcast or an internet broadcast etc. For this environment, mixing and processing operations must be conducted in real-time, given that the material is being sent to air immediately.

Similarly, an environment for film or video recording is illustrated at 105. In this environment, it is normal practice for the audio assets and video assets to be processed separately before being combined in the final edit. The particular technique to be deployed will also be dependent on the effect to be achieved and the overall budget made available for post production activities.

Thirdly, an audio recording environment 106 is shown which, in this example, represents the process of taking a mixed and processed stereo source, recording it to a master medium and then subsequently duplicating the recording for distribution.

Figure 2:
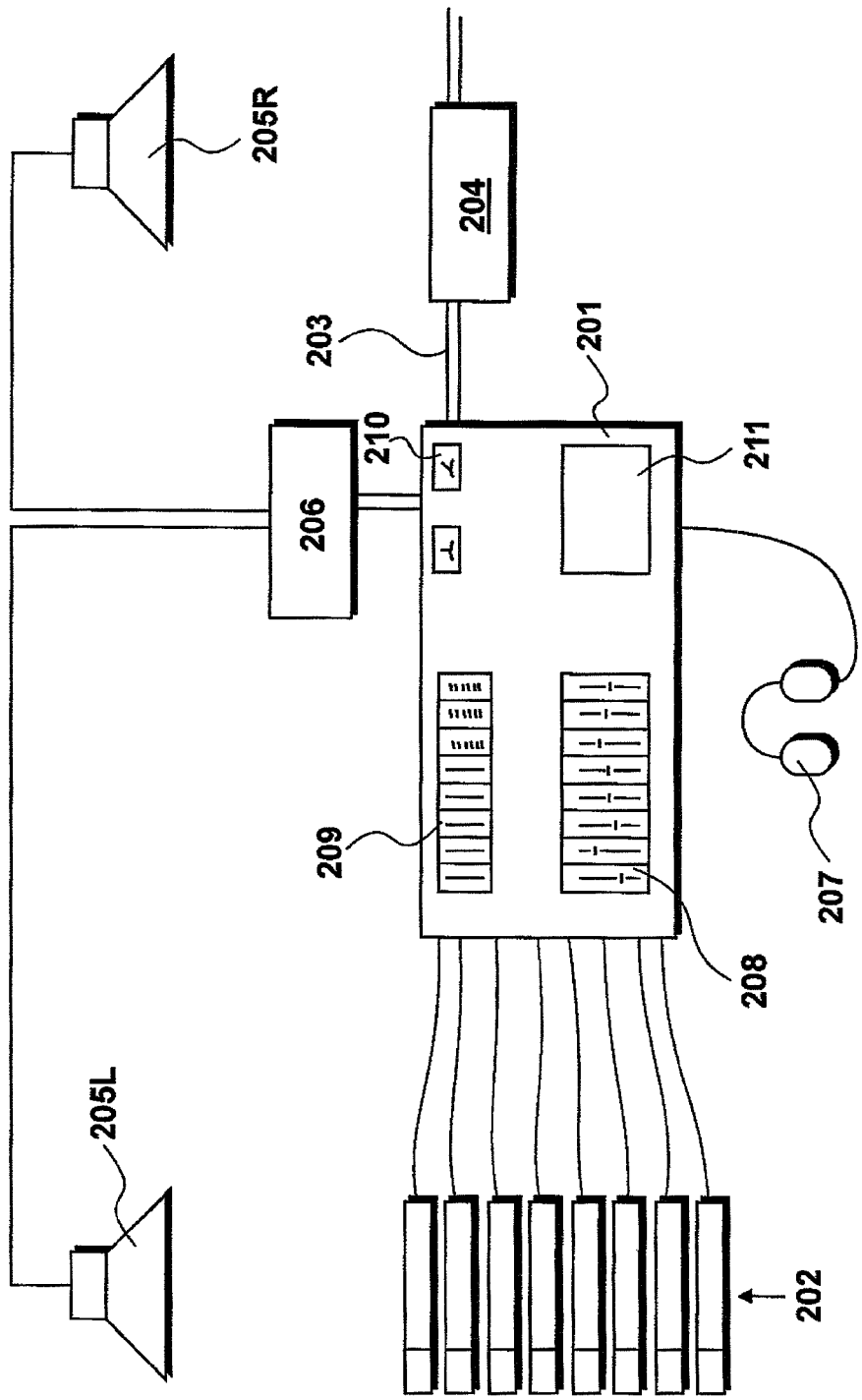
FIG. 2 illustrates the digital mixing desk identified in FIG. 1.

In the broadcasting and video recording environment 104 and 105, it is appreciated that images are mixed and processed and the processing of video material is illustrated at 107. For all of the environments shown, it is necessary to receive audio material, mix this material and subsequently process this material. An environment for achieving this manipulation of the audio assets is illustrated at 108. Audio processing environment 108 also detailed in FIG. 2.

At the heart of the audio processing environment, there is provided a digital mixing desk 201. For the purposes of this illustration, it is assumed that all of the required mixing and processing functionality is contained within the mixing desk 201; although it is appreciated that in alternative environments additional equipment for particular applications may be interfaced to the mixing desk 201.

The mixing desk 201 receives audio sources which, in this example, are illustrated as microphones 202. However, it should be appreciated that any audio source may be processed in this way and the number of audio channels being processed may vary significantly. Furthermore, it is also appreciated that live data may be mixed and processed in combination with recorded data.

Again for the purposes of illustration, the mixing desk 201 provides a stereo output 203 to a recording and broadcast system 204. The environment is also provided with loud speakers 205L and 205R to facilitate monitoring while the mixing operation takes place. The monitors receive an output signal from a power amplifier 206, that in turn receives a stereo output from the mixing desk 201.

An operator is also provided with stereo headphones 207 and it should be appreciated that an operator may receive the same output 203 for both the monitors 205 and for the headphones 207 or, alternatively, other signals may be supplied to the headphone channel so as to facilitate the mixing procedures.

The mixing desk itself includes a plurality of sliders 208 for adjusting the levels of the individual channels. In this example, the desk is capable of receiving eight audio inputs and for that eight input sliders 208 are provided. However, it should be appreciated that this is for illustrative purposes only and substantially more audio channels may be provided on typical professional mixing equipment.

A bank of the visible displays 209 ensures that each individual channel may be monitored. Similarly, meters 210 are provided for monitoring the stereo mix.

The user interface also includes many other rotary controls to facilitate adjustment of individual channels and the mix as a whole. Traditionally, this includes controls for adjusting filter parameters and, traditionally, having these parameters set to particular conditions would result in a frequency response for the channel being set permanently, unless further modifications are made. Thus, traditionally, an operator would have direct control of the parameters themselves and the operator would be responsible for controlling the way in which the processing functionality modifies and mixes the incoming signals so as to produce the final result.

In this example, the mixing desk is also provided with a computer-like interface 211, that may be particularly suited to working with multi-channel outputs as described in the present applicant's British patent 2277239 and British patent 2294854.

Figure 3:
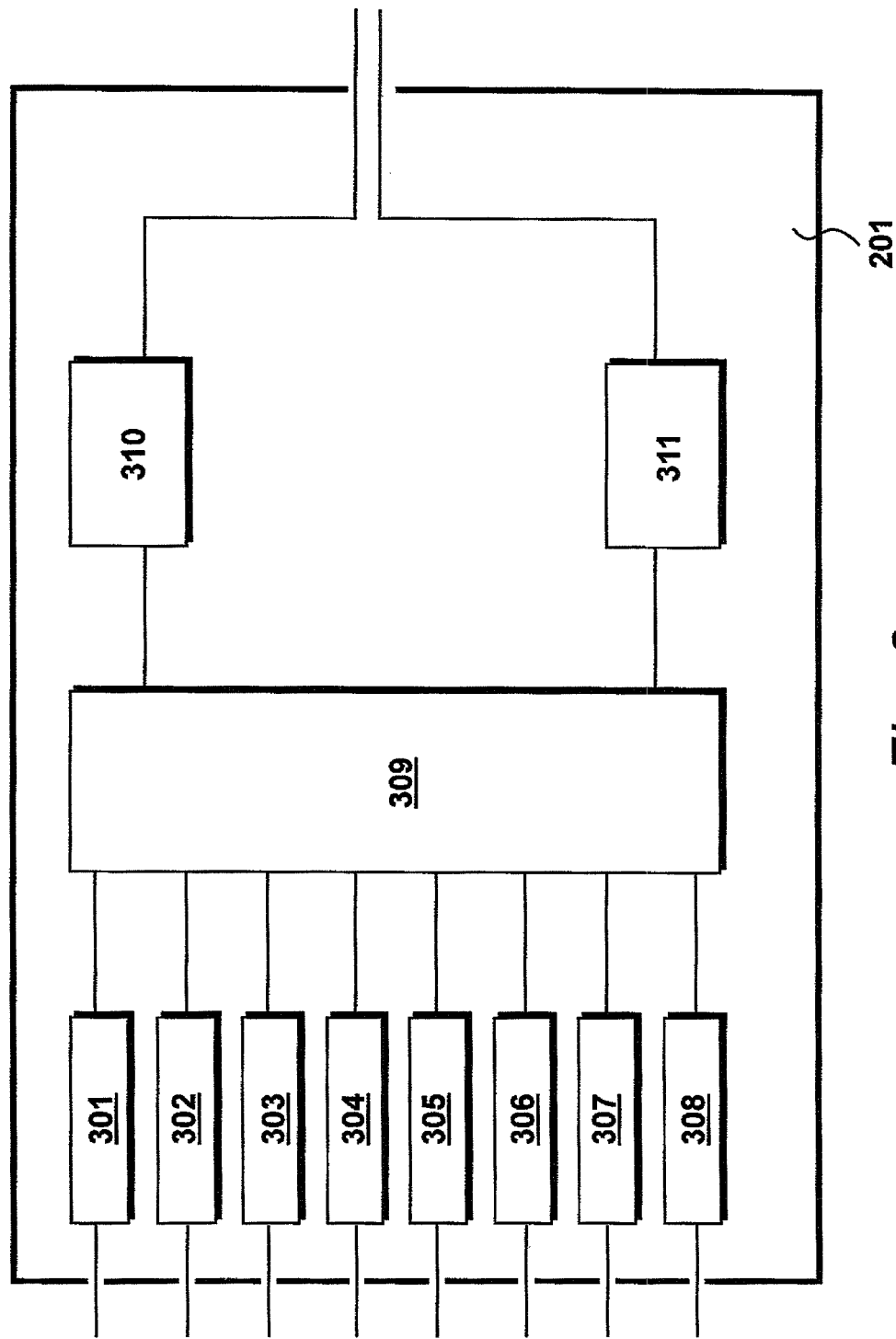
FIG. 3 illustrates operations performed in the mixing desk of FIG. 2.

Operations performed in mixing desk 201 are shown schematically in FIG. 3. Each input channel has a dedicated channel processing system which, in this example, eight are identified as 301 to 308. Each channel processing system (301-308) allows input signals to be processed independently and the channel itself is provided with substantial processing capability.

After processing each input channel individually, a mixing operation is performed at mixing sub-system 309 in order to produce mixed signals, each being made up of signals received from a plurality of the input channels. In this example, a stereo output is produced such that a mixed signal is provided to a left channel processor 310 and to a right channel processor 311. However, it should be appreciated that, in some environments, more output channels are required and the stereo system of FIG. 3 is shown for illustrative purposes only.

Thus, the collection of input signals are received which, in professional equipment, could amount to substantially more than the eight (8) of FIG. 3. Being separate signals, they can be combined by mixing in order to produce output signals; of which 310 and 311 represent a stereo mix. It should also be appreciated that other output signals are produced, such as those provided to the internal monitors 205 and to the stereo headphones 207.

Figure 4:
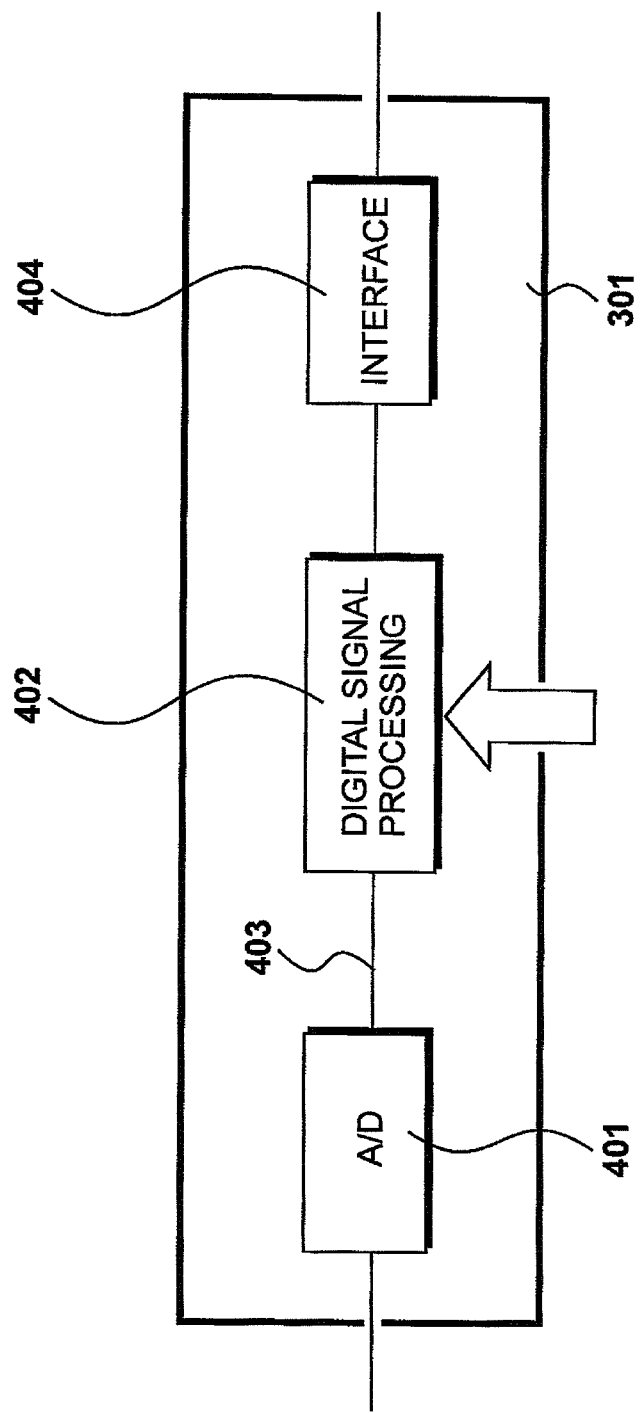
FIG. 4 details the channel processing system identified in FIG. 3.

Channel processing system 301 is detailed in FIG. 4. An analogue input signal is supplied to an analogue to digital converter 401, that in turn provides a digital signal to a digital signal processing environment 402. In this embodiment, the analogue to digital converter 401 produces a 24 bit digital signal, submitted on a bus 403 to the digital signal processing environment 402.

Within the digital signal processing environment 402 itself, high definition floating point manipulations are performed, typically at 36 bits or at 40 bits internally within the processors. Furthermore, an interface circuit 404 ensures that the output from the digital signal processing environment 402 is reconverted into a form of representation compatible with mixing sub-system 309.

In terms of the hardware realisation of the system shown in FIG. 4, and as would be known to those skilled in the art, an engineering assessment is made in terms of the degree of processing required in order to provide the desired level of processing capability. Presently, systems of the type shown in FIG. 4 are implemented on physical processing boards containing typically 12 digital signal processing (DSP) chips, such as those produce by Sharp Inc of Japan. In preferred embodiments, to be described with reference to FIGS. 5, 6 and 8, a filtering operation is performed and a gain control operation is performed. In this illustrative embodiment, a whole DSP processing chip would be allocated for each of these operations for each individual channel.

However, it should be appreciated that the functionality could also be achieved by means of a more general purpose processing environment although, eventually, a limitation would be reached in terms of the number of channels that could be processed, due to the availability of processing capability. However, in an alternative embodiment, it would be possible for a general purpose processing system to be programmed to achieve some of the inventive results. Furthermore, it would also be possible for standard type media containing computer readable instructions to be distributed and subsequently installed by computer users so as to achieve some of the claimed methods.

The present embodiments are all concerned with the processing of an audio input signal to produce a processed audio output signal. An input signal is dynamically filtered to produce a first stage signal consisting of the selected frequency band of the input signal. Thereafter, gain is applied to the first stage signal that is dynamically controlled in response to a control signal so as to produce a second stage signal. The control signal itself is derived from the first stage signal. Thereafter the second stage signal is processed in combination with the original audio input signal to produce the processed output signal.

Figure 5:
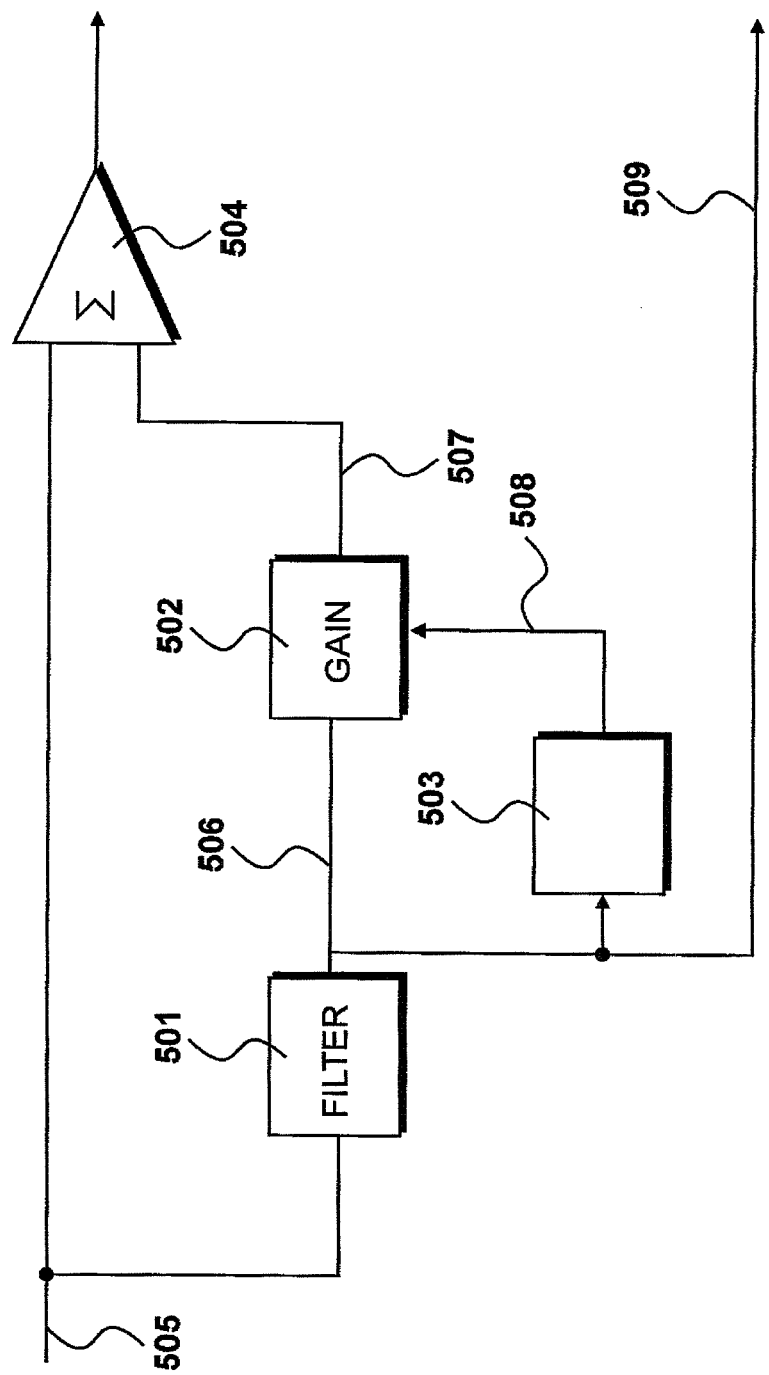
FIG. 5 illustrates the first embodiment of the present invention.

A first implementation of the above approach is illustrated in FIG. 5. As previously stated, DSP chips within the digital signal processing system are allocated in order to provide the functionality of the filter 501 and the gain control 502. A modest side chain processing circuit 503 is also provided, along with a summation circuit 504.

In the following, reference is made to an "input" signal and to an "output" signal. These refer to the inputs and outputs respectively of the circuits shown in FIGS. 5, 6 and 8 and not to the overall input and output signals of type shown in FIG. 2.

Thus, in the circuit of FIG. 5, an audio input signal 505 is received as an original signal that is supplied to the summation circuit 504 and to the filter 501. The filter 501 allows a particular frequency band of the received input signal to be selected. In the preferred embodiment, this is achieved by the provision of two high pass filters, for attenuating frequency signals below the selected band, and two low pass filters for attenuating frequencies above the selected band.

The output from filter 501 is considered to be a first stage signal, present on bus 506. Gain applied to the first stage signal is controlled by the gain control 502 to provide a second stage signal, on bus 507, that is combined with input signal 505 within the summation circuit 504. The original audio input signal is thus processed in combination with the second stage signal to produce a processed output signal.

The gain control circuit 502 is controlled by the control signal on bus 508. This control signal is itself derived from the first stage signal, after receiving a modest degree of processing by circuit 503. The first stage signal is also provided as an audio output on an output line 509.

In use, a gain control circuit 502 provides dynamic control of gain parameters such that, for example, a high degree of gain may be applied to low level signals with a low degree of gain being applied to high level signals; thereby compressing the signal so as to have a smaller dynamic range. However, the treated signal is combined back with the original source, so as to provide a substantially more sophisticated compression effect.

Gain control is available so as to adjust the overall degree of compression provided. However, the compressed signal is also frequency selective, such that some frequency components will undergo a greater degree of compression than others. Furthermore, the particular range over which this compression effect takes place is adjustable.

Experience has shown that the effect is particularly attractive when applied to drums, such that the tonal qualities of the drums may be modified with minimal intervention on the part of the operator. Dynamic modification of the gain control takes place in real-time in response to frequency content, such that the modification may take place at a rate that could not be matched by manual or automated modification to control parameters directly.

Figure 6:
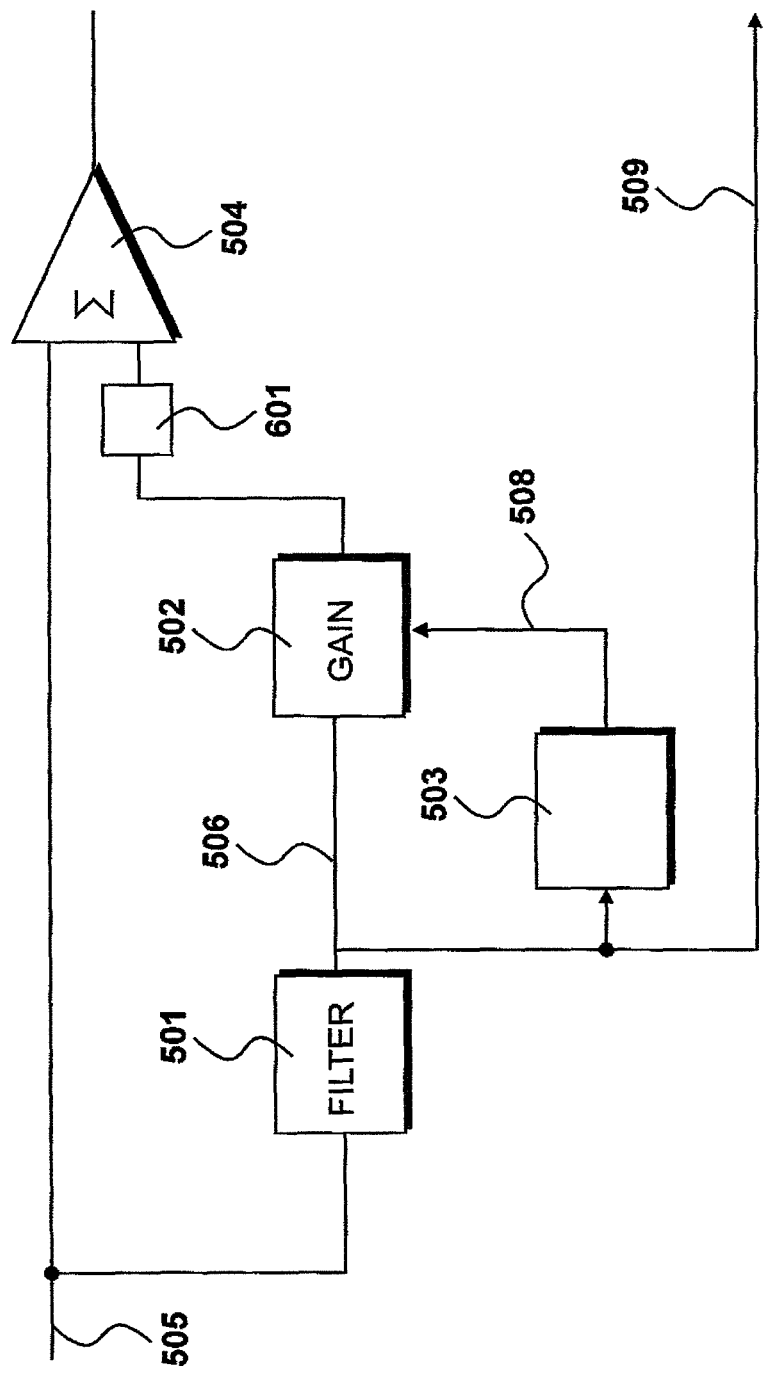
FIG. 6 illustrates a second embodiment of the present invention.

An alternative embodiment is shown in FIG. 6, in which components having the same functionality are identified by the same reference numeral as that used in FIG. 5. In this example, an inverter 601 has been provided between the gain control circuit 502 and an input to the summation circuit 504. In this way, the second stage signal is subtracted from the original audio input signal and not added to the original audio input signal. Thus, it is possible to cancel a selected band of frequencies from the main signal. Thus, this may be seen as a dynamic limiting/gating operation which, in preference to gating the whole signal (i.e. producing a silence), the gating may be frequency selective.

An application for such a procedure would be in the control of sibilance, also commonly know as a "de-esser". However, it is should also be appreciated that the technique may be deployed in other environments such as when unwanted noise is present at a particular frequency. Furthermore, having removed the offending frequencies, an operator may determine the extent to which a proportion of the offending frequencies is returned to the original audio signal. Thus, in this way it may be possible to attenuate an offending signal while at the same time allowing a proportion of that signal to remain.

Thus, in an outside broadcast for example, it would be possible to attenuate offending frequencies so as to ensure that, for example, commentators and interviewees are heard over background noises while at the same time ensuring that these noises are still present so as to maintain a degree of realism. An operator must therefore select and define the offending frequencies and then control the extent to which those frequencies are attenuated.

In the illustrated examples of FIGS. 5 and 6, an audio input signal is received as an original signal that is supplied both to filter 501 and as an input to summation circuit 504 for processing in combination with the second stage signal as described. Thus, the audio input signal is supplied in the form it is received for processing in combination with the second stage signal derived from it. Hence, it is to be understood that the original audio input signal does not undergo any further operations other than being supplied to the filter prior to being supplied for processing in combination with a signal derived from it.

Figure 7:
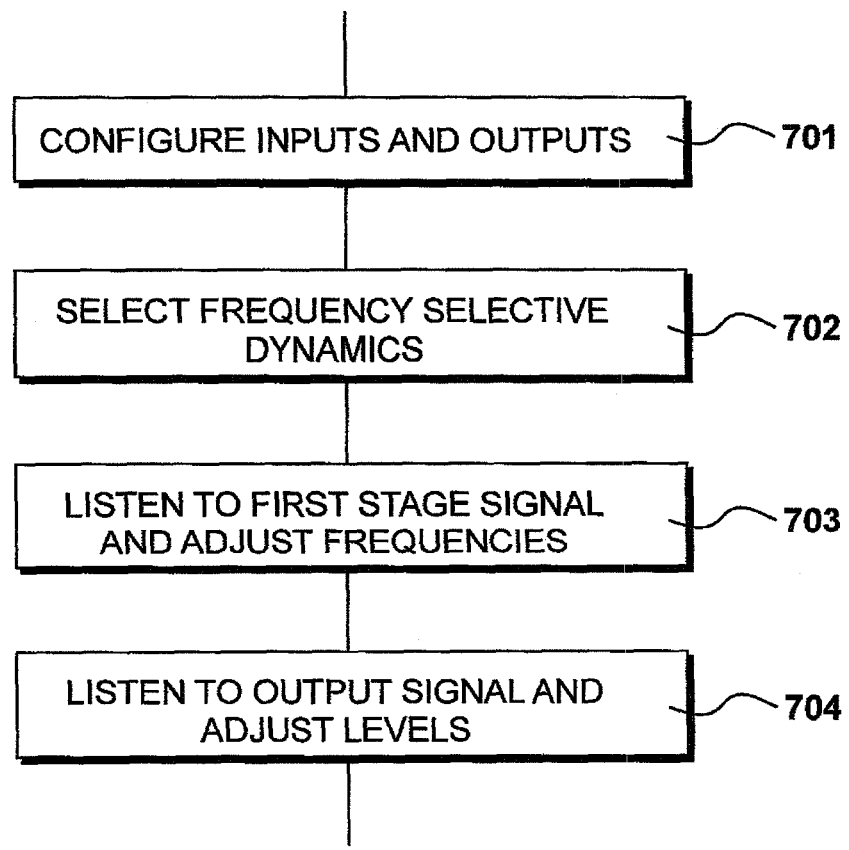
FIG. 7 illustrates a preferred approach for deploying the functionality of the circuit illustrated in FIG. 6.

A preferred approach for deploying the functionality of the circuit illustrated in FIG. 6 is detailed in FIG. 7. At step 701, inputs and outputs are configured for the particular application. Thus, for example, this may involve receiving several audio inputs from a live environment as part of a radio broadcast. Consequently, a stereo output is required on line 203 and the signal must be of a broadcast quality. Thus the signal must satisfy the usual requirements for the broadcaster concerned, while ensuring that the content of the broadcast can be heard clearly but at the same retaining a degree of realism.

At step 702 it is appreciated that the techniques described herein may be applicable for the application concerned; the techniques have been identified as "frequency selective dynamics". As previously described, the operator is now required to identify the particular frequency components of interest and then use this selection in order to achieve an optimal degree of attenuation and then re-mixing a proportion of the offending component back with the input signal.

Having established this, the system will itself automatically track and attenuate the presence of these components and it is not necessary for the operator to make any further adjustments. Thus, in this way, a highly sophisticated degree of processing has been achieved without ongoing manual intervention on the part of an operator. It should also be appreciated that in a broadcast environment, relatively little time is allowed for experimentation and the operator is therefore under pressure in order to achieve acceptable results in relatively short time scales.

The present procedure facilitates rapid deployment of the frequency selective dynamics procedure. At step 703 the operator ceases to listen to the input signal present at 505 or the output signal produced by the summation circuit 504. Instead, using headphones 207, the operator actually listens to the first stage signal produced by filter 501. While listening to this first stage signal, the operator makes adjustments to the filter frequencies and the operator will aim to maximise the level of the first stage signal as heard by the headphones 207.

Thus, in order to identify the correct frequency band, the operator is doing something counter-intuitive in that measures are being taken to increase the level of the unwanted signal as a procedure for correctly identifying its frequency band. Furthermore, an operator will also be aware of the preference for minimising the width of the frequency band while removing substantially all of the unwanted noise. Experiments have shown that under many operating conditions, operators easily adapt to this way of working such that undesirable frequency components can be isolated relatively quickly.

After the frequency band of interest has been identified, the operator then switches to listening to the actual output signal in step 704 and by doing this, a subjective assessment may be made as to the extent to which the offending noise should be reintroduced, thereby maintaining realism. Thus, it is possible for an operator to achieve a highly sophisticated result by just listening to the two signals and making modest adjustments to the controls. By listening to the first stage signal itself (i.e. the offending noise) it is made relatively easy for the operator to make the appropriate selection and the operator does not need to rely on sophisticated graphics or other user interfaces.

A second alternative embodiment is illustrated in FIG. 8 and again components providing the same functionality of those shown in FIG. 5 have been identified with the same reference numerals. In this example, the original audio input signal is processed in combination with the second stage signal and also the first stage signal.

Figure 8:
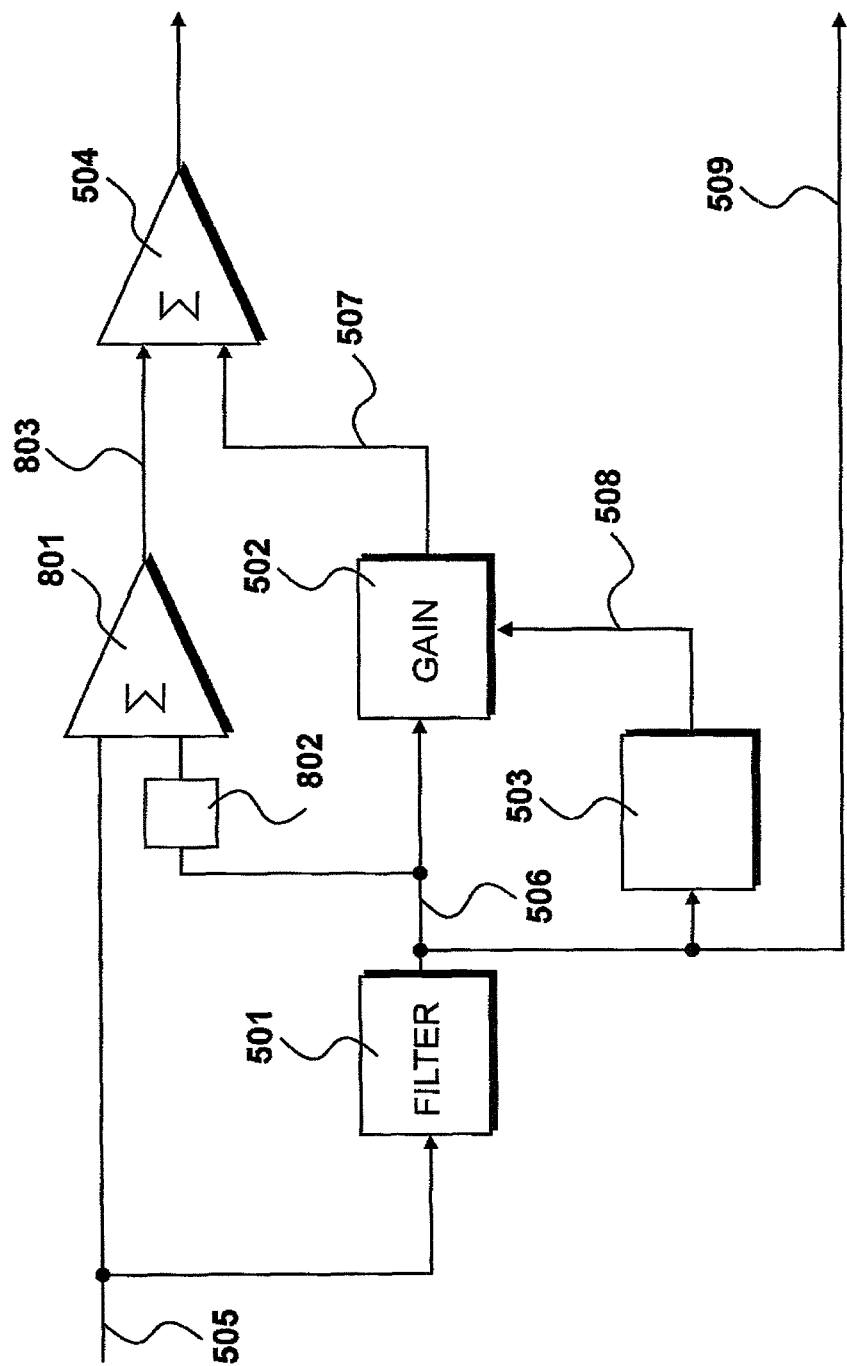
FIG. 8 shows a third embodiment of the present invention.

The arrangement of FIG. 8 is similar to that shown in FIG. 5 in that the second stage signal at 507 is supplied as an input to summation circuit 504. However, in this example, the original audio input signal itself has undergone processing before reaching summation circuit 504. For this purpose, a second summation circuit 801 is provided.

In the circuit of FIG. 8, an audio input signal 505 is received as an original signal that is supplied to summation circuit 801 and to the filter 501. The first stage signal at 506 is inverted by inverter 802 and is then supplied as an input to summation circuit 801. Thus, the first stage signal 506 is subtracted from the original audio input signal 505 and the resulting output from summation circuit 801, third stage signal 803, is supplied as an input to summation circuit 504. The third stage signal 803 is then combined with the second stage signal 507 by summation circuit 504 to produce a processed audio output signal.

The approach provides for a further level of sophistication in terms of achieving gating or more preferably compression. The filter 501 selects a frequency band for compression to be applied. The selected frequency band is subtracted from the original audio input signal such that the selected band is totally absent from the resulting signal. A proportion of the selected frequency band is then reintroduced by combining the second stage signal with the processed input signal. Again, in the circuit of FIG. 8, the original audio input signal does not undergo any further operations other than being supplied to the filter prior to being supplied for processing in combination with a signal derived from it.

A high level of control is possible given that the frequencies of interest are firstly totally removed and then the extent to which a reintroduction occurs is controllable by an operator. The use of digital circuitry within this environment makes total cancellation possible given that, from any value, its exact opposite is easily calculable. It is therefore appreciated that techniques of this type may be deployed within the digital domain to an extent that would not be achievable within a totally analogue environment.

Figure 9:
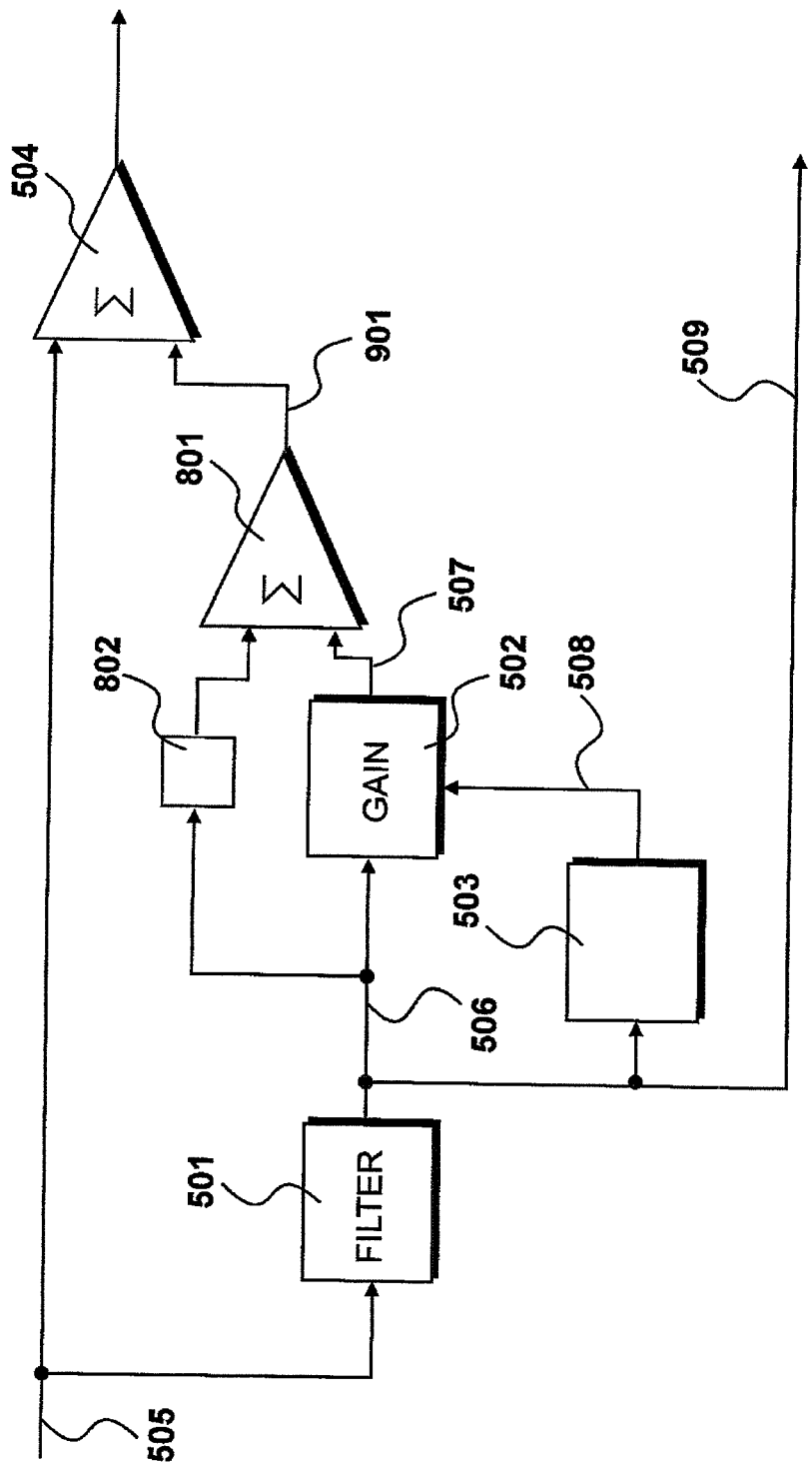
FIG. 9 shows an alternative arrangement of FIG. 8.

FIG. 9 shows an alternative arrangement to that of FIG. 8 and again components providing the same functionality of those shown in FIG. 5 and FIG. 8 have been identified with the same reference numerals. In this example, the original audio input signal is also processed in combination with both the second stage signal and the first stage signal. However, the individual processing operations of FIG. 9 differ from those of FIG. 8.

Again, in the circuit of FIG. 9, the original audio input signal does not undergo any further operations other than being supplied to the filter prior to being supplied for processing in combination with a signal derived from it. The arrangement of FIG. 9 is similar to that shown in FIG. 5 in that the original audio input signal is supplied as an input to summation circuit 504. However, in this example, the second stage signal itself has undergone processing before reaching summation circuit 504. For this purpose, a second summation circuit 801 is also provided.

In the circuit of FIG. 9, an audio input signal 505 is received as an original signal that is supplied to summation circuit 504 and to the filter 501. The first stage signal at 506 is inverted by inverter 802 and is then supplied as an input to summation circuit 801. The second stage signal 507 is also supplied as an input to summation circuit 801. The first stage signal 506 is subtracted from the second stage signal 507 and the resulting output from summation circuit 801, third stage signal 901, is supplied as an input to summation circuit 504. The third stage signal 901 is then combined with the original audio input signal 505 by summation circuit 504 to produce a processed audio output signal.

Thus, each of the circuits of FIGS. 8 and 9 perform processing operations to combine the original input signal and the second stage signal and, additionally, the first stage signal to produce a processed output signal. During the processing of the original input signal, the first stage signal and the second stage signal, the circuits of FIGS. 8 and 9 both utilise a third stage signal. The third stage signal is the result of a processing operation combining two signals of: the original input signal, the first stage signal and the second stage signal. The third stage signal is then processed in combination with the remaining of the three signals.

Comparing the circuits of FIGS. 8 and 9 it can be seen that although each performs different operations to the other, each receives an audio input signal, performs an addition of the second stage signal and performs a subtraction of the first stage signal. Thus, for the same audio input signal received at 505, the same first stage signal at 506 and the same second stage signal at 507, the circuits of FIGS. 8 and 9 produce equivalent output signals.

FIGS. 8 and 9 hence illustrate that in the digital domain different operations may be performed to process the audio input signal, the second stage signal and the first stage signal in combination that achieve a common effect.

What is claimed is:

1. A method of processing an audio input signal to produce a processed audio output signal, comprising the steps of:
   receiving the audio input signal as an original signal;
   filtering said audio input signal to produce a first stage signal of a selected frequency band of said audio input signal;
   deriving a control signal from said first stage signal;
   dynamically controlling gain applied to said first stage signal in response to said control signal to produce a second stage signal;
   combining said first stage signal and said second stage signal to produce a third stage signal;
   combining said original signal and said third stage signal to produce said processed audio output signal.

2. A method according to claim 1, wherein said step of combining said first stage signal and said second stage signal includes the step of subtracting said first stage signal from said second stage signal.

3. A method according to claim 1, wherein said step of combining said original signal and said third stage signal includes the step of adding said original signal with said third stage signal.

4. A method according to claim 1, wherein:
   the audio input signal is one of:
      a live signal, and
      a recorded signal;
   the processed output signal is one of:
      recorded as an audio signal only,
      recorded in combination with a video signal; and
   the processed audio output signal is transmitted as one of:
      a radio broadcast and
      a television broadcast.

5. A method according to claim 1, wherein the audio input signal is dynamically filtered by attenuating frequency components that are below said selected frequency band and attenuating frequency components that are above said selected frequency band.

6. A method according to claim 1, wherein the level of said derived control signal is manually adjustable.

7. A method according to claim 1, wherein the filtering step and the gain control step are executed by digital signal processing systems operating in real-time.

8. Audio signal processing apparatus for processing an audio input signal to produce a processed audio output signal, comprising:
a filter configured to pass a selected frequency band of a received input signal;
a dynamic gain control configured to control the gain of a signal in response to a control signal; and
a processor configured to combine signals to produce a processed output signal, wherein
said apparatus is arranged to receive the audio input signal as an original signal,
said filter is arranged to filter said audio input signal to produce a first stage signal of a selected frequency band of said audio input signal;
said dynamic gain control is arranged to:
derive a control signal from said first stage signal to, and
control the gain applied to said first stage signal in response to said control signal to produce a second stage signal; and
said processor is arranged to:
combine said first stage signal and said second stage signal to produce a third stage signal, and
combine said original signal and said third stage signal to produce said processed audio output signal.

9. Audio signal processing apparatus according to claim 8, wherein said processor is arranged to combine said first stage signal and said second stage signal by subtracting said first stage signal from said second stage signal, and to combine said original signal and said third stage signal by adding said original signal with said third stage signal.

10. Audio signal processing apparatus according to claim 8, wherein said filter includes a low pass component and a high pass component in order to pass said selected frequency band.

11. Audio signal processing apparatus according to claim 8, wherein said filter and said dynamic gain control are constructed from digital signal processing systems operating in real-time.

12. A non-transitory computer-readable medium having computer-readable instructions executable by a computer such that, when executing said instructions, a computer will perform the steps of:
receiving an audio input signal as an original signal;
filtering said audio input signal to produce a first stage signal of a selected frequency band of said audio input signal;
deriving a control signal from said first stage signal;
dynamically controlling gain applied to said first stage signal in response to said control signal to produce a second stage signal;
combining said first stage signal and said second stage signal to produce a third stage signal;
combining said original signal and said third stage signal to produce a processed audio output signal.

13. A non-transitory computer-readable medium according to claim 12, wherein a computer executing said instructions is configured such that the level of said derived control signal is manually adjustable.

14. A non-transitory computer-readable medium according to claim 12, wherein when executing said instructions a computer will combine said first stage signal and said second stage signal by subtracting said first stage signal from said second stage signal.

15. A computer-readable medium according to claim 12, wherein when executing said instructions a computer will combine said original signal and said third stage signal by adding said original signal with said third stage signal.

* * * * *